R. R. Sylands.
Pulp Making
No 90,472.   Patented May 25, 1869.
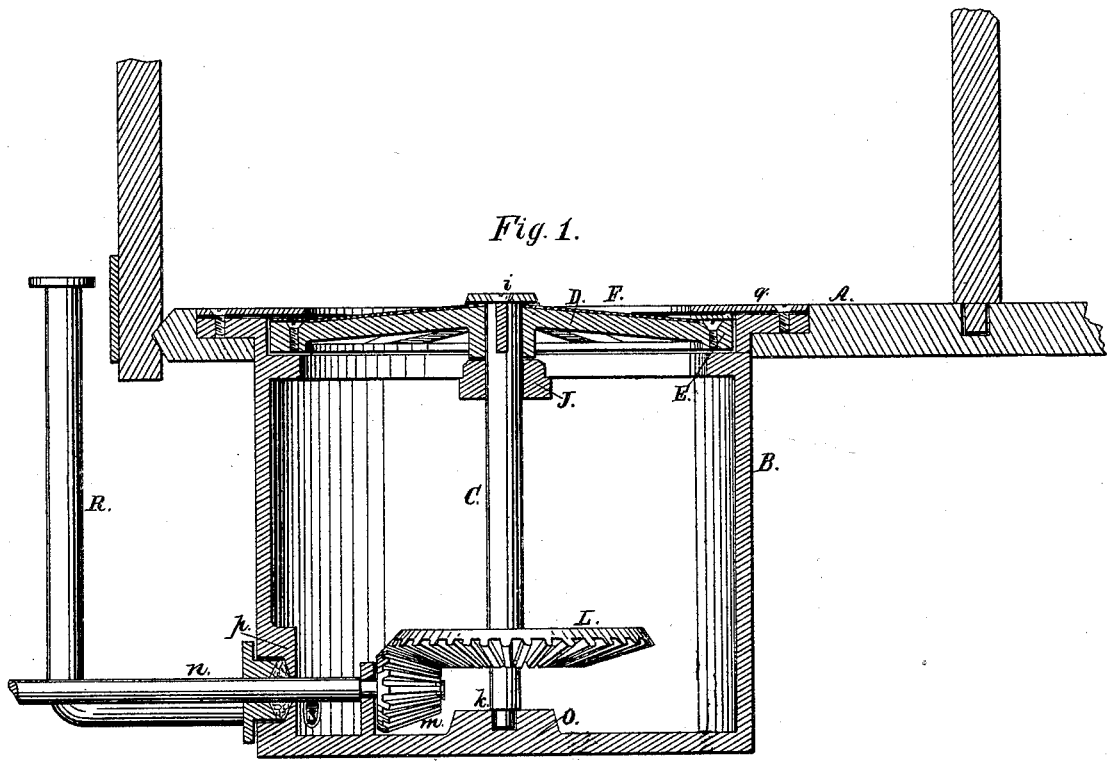
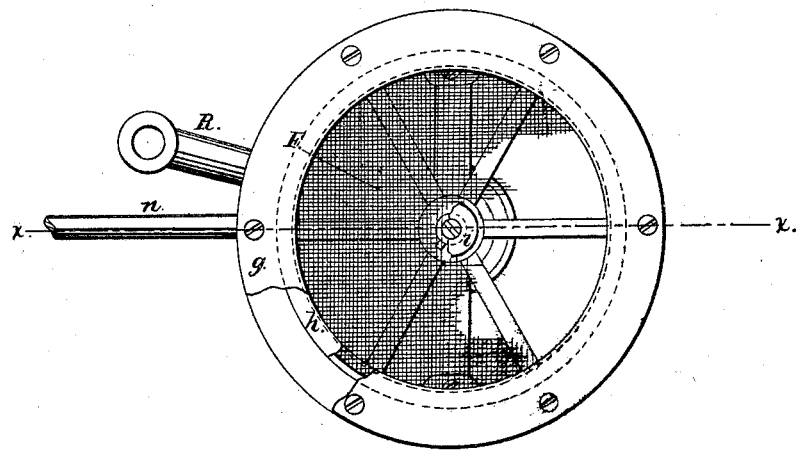
Witnesses.
Wm A Morgan
Wm C Dean Overell
Inventor.
R. R. Syland
per Wmurf
Attorney

United States Patent Office.

RICHARD R. SYLANDS, OF MILLBURN, NEW JERSEY, ASSIGNOR TO HIMSELF AND JOHN S. REEVE, OF SAME PLACE.

Letters Patent No. 90,472, dated May 25, 1869.

---

IMPROVED SUBMERGED CENTRIFUGAL PULP-WASHER.

---

The Schedule referred to in these Letters Patent and making part of the same.

---

*To all whom it may concern:*

Be it known that I, RICHARD R. SYLANDS, of Millburn, in the county of Essex, and State of New Jersey, have invented a new and improved Submerged Centrifugal Pulp-Washer; and I do hereby declare that the following is a full, clear, and exact description thereof, which will enable those skilled in the art to make and use the same, reference being had to the accompanying drawings, forming part of this specification.

This invention relates to an improvement in the method of washing paper-pulp in the engine in which the pulp is ground; and It consists in revolving a sieve or perforated disk in the bottom of the engine, through which the more dense and foul portion of the water escapes, as will be hereinafter described.

Figure 1 represents a sectional elevation of the washer attached to the bottom of a paper-engine, (the latter being shown in red color,) and the section being through the line $x$ $x$ of fig. 2.

Figure 2 is a top view, showing the sieve, and sections of the discharge-pipe, and the driving-shaft.

Similar letters of reference indicate corresponding parts.

A represents the bottom of the engine, (seen in red.)

B is the washing-vessel.

This vessel is cylindrical in form, of suitable diameter, in which there is a central vertical shaft, C, to the upper portion or top part of which there is attached a spider, D, with a rim, E, as seen in the drawing.

The sieve or metallic perforated disk, F, lies upon the arms and rim of this spider, and is secured, by annular rings $g$ and $h$, to the rim E, and to the flange of the washing-vessel B, as seen in fig. 1.

A central screw and washer confine the sieve to the end of the shaft C, as seen at $i$.

The shaft C is supported in its upper portion by a cross-bar, J, in which it has a bearing.

In this example of my invention, the shaft is stepped into the bottom of the vessel B, as seen at $k$, and driven by a bevel-wheel, L, from a driving bevel-pinion, $m$, and shaft, $n$, as seen in the drawing; but I do not confine myself to this arrangement.

The shaft C may extend through the bottom, $o$, of the vessel B, and be driven by gearing or a pulley below the washer, if more convenient; or the shaft or sieve may be revolved in any other manner.

In any case where a shaft passes through the bottom or side of the washer, the joint should be packed water-tight, as seen at $p$.

The spider D and rim E are also made to work water-tight, by packing or otherwise, in the recess in the upper part of the vessel B, so that all the water and sand, or other foreign matter, shall be compelled to pass through the sieve.

The sieve is placed so that it is flush with the bottom surface of the engine, and it is revolved, by the shaft C, at any required and suitable speed.

The friction occasioned by such revolution, and the centrifugal force exerted, are sufficient to prevent the sieve from clogging, so that the more filthy water and impurities, which naturally settle to the bottom of the engine, have an unobstructed passage through and into the vessel, B, below.

R is the discharge-pipe, and

S is the orifice through which the impure water enters that pipe.

This discharge-pipe is carried up, on the outside, to any desired height, but the water is discharged at a point not more elevated than the level of the water in the engine, so that there is no upward pressure from below the sieve, and no vacuum formed, and nothing required for the perfect working of the washer but the simple pressure of the atmosphere upon the contents of the engine.

By the ordinary method, the pulp is washed (or attempted to be washed) by allowing a stream of water to be discharged from the surface; but this is, of course, a very imperfect operation, as the dirt and impure water is always found at the bottom.

By my washer, the pulp is thoroughly cleansed, by removing the dirty water, &c., from the bottom, so that the quantity of chlorine used in the bleaching-process is reduced at least one-third. The pulp is also greatly improved in quality.

For the purpose of removing sand, or the heavier and insoluble matter which passes through the sieve, a suitable hand-hole through the washer is provided, and secured by a suitable plate when not opened for use.

I claim as new, and desire to secure by Letters Patent—

1. In combination with a paper or pulp-engine, the revolving sieve or perforated disk F, arranged in the bottom of the engine, and operating substantially as and for the purposes described.

2. The washing-vessel B, in combination with a revolving sieve, arranged substantially as set forth.

3. The arrangement shown and described, (or any equivalent arrangement,) whereby a sieve or perforated disk or screen may be revolved, so as to discharge the water and impurities from the bottom of a pulp-engine.

RICHARD R. SYLANDS.

Witnesses:
WILLIAM P. MILLER,
WM. HOLMES.